(12) United States Patent
Card

(10) Patent No.: US 10,814,899 B2
(45) Date of Patent: Oct. 27, 2020

(54) STEERING WHEEL HAVING A COVER WITH A LAYERED SEAM

(71) Applicant: Rivian IP Holdings, LLC, Plymouth, MI (US)

(72) Inventor: Gary Andrew Card, Macomb, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 219 days.

(21) Appl. No.: 16/020,226

(22) Filed: Jun. 27, 2018

(65) Prior Publication Data

US 2020/0001911 A1  Jan. 2, 2020

(51) Int. Cl.
| | |
|---|---|
| *B62D 1/06* | (2006.01) |
| *B60R 21/05* | (2006.01) |
| *G06F 3/044* | (2006.01) |
| *B32B 3/04* | (2006.01) |
| *B32B 7/08* | (2019.01) |
| *B32B 9/02* | (2006.01) |
| *B32B 3/06* | (2006.01) |

(52) U.S. Cl.
CPC .............. *B62D 1/065* (2013.01); *B60R 21/05* (2013.01); *G06F 3/044* (2013.01); *B32B 3/04* (2013.01); *B32B 3/06* (2013.01); *B32B 7/08* (2013.01); *B32B 9/025* (2013.01); *B32B 2305/18* (2013.01); *B32B 2317/08* (2013.01); *B32B 2605/00* (2013.01)

(58) Field of Classification Search
CPC ......... B62D 1/065; B60R 21/05; G06F 3/044; B32B 3/04; B32B 3/06; B32B 7/08; B32B 9/025; B32B 2305/18; B32B 2317/08; B32B 2605/00
See application file for complete search history.

(56) References Cited

U.S. PATENT DOCUMENTS 6,392,195 B1 * 5/2002 Zhao ..................... B62D 1/065
219/204

* cited by examiner

*Primary Examiner* — Shawntina T Fuqua
(74) *Attorney, Agent, or Firm* — Clements Bernard Walker

(57) ABSTRACT

The present disclosure provides a steering wheel that includes a core assembly defining a body, at least one functional element wrapped about the body, and a cover arranged over the functional element. The cover includes a first end portion and a second end portion opposite the first end portion. The first and second end portions are joined and superimposed on the functional element at a notch such that the second end portion is positioned between the functional element and the first end portion. The functional element may be a heating element or a touch sensor. The steering wheel may include both a heating element and a touch sensor. In one form, the cover includes two zones and the notch extends along a diameter of the rim and/or along at least a portion of a front face of the steering wheel.

15 Claims, 4 Drawing Sheets

STEERING WHEEL HAVING A COVER WITH A LAYERED SEAM

FIELD

The present disclosure relates to a steering wheel for a motor vehicle, and more particularly to a steering wheel having a cover made of a textile material and wrapped about the steering wheel.

BACKGROUND

The statements in this section merely provide background information related to the present disclosure and may not constitute prior art.

The automotive industry strives to manufacture vehicles having interior and exterior designs that are aesthetically pleasing. For example, high-quality automobiles can include a cover made of a textile material, such as leather, wrapped about a steering wheel of the automobile.

To provide comfort for the driver, a steering wheel can include a multi-layer structure that includes, for example, a padding, a functional layer (e.g., heating and sensory layer), and the cover. Typically, the cover is provided as a piece of material that is wrapped about the steering wheel and joined by a seam at the edges of the material. For example, a first seam joins the long sides of the cover and extends circumferentially along the steering wheel, and a second seam joins the short sides of the cover and extends transverse to the first seam.

There are different ways to join the sides of the cover. For example, ends of the cover may be joined by a stitch and then the pressed, fitted or glued into a stitch ditch or tuck groove defined in the padding. In this example, the functional layer is discontinued at the tuck groove to provide room for the groove and the joined ends. By having the joined ends disposed in the groove, the seam appears flush with the rest of the cover, however, the groove also creates a dead zone in which the functional layer is not provided.

In another example, the ends of the cover are pulled back under themselves with the functional layer extending under the cover. While this method inhibits dead zones along the steering wheel, the joined ends form a raised surface at the seam, and thus, can provide an undesired appearance and feel. These and other issues are addressed by the present disclosure.

SUMMARY

This section provides a general summary of the disclosure, and is not a comprehensive disclosure of its full scope or all of its features.

In one form, the present disclosure is directed toward a steering wheel that includes a core assembly including a rim, a padding member disposed on the rim and defining a groove, a functional element wrapped about the padding member, and a cover arranged about the rim over the functional element. The cover forms a layered seam at which a first end portion and a second end portion are joined in an overlapping manner. The layered seam is superimposed at the groove such that the second end portion is positioned between the functional element and the first end portion.

In one form, the layered seam joins two short sides of the cover, and the groove circumferentially extends about the rim to accommodate the layered seam and the functional element. Alternatively, the layered seam joins two longitudinal sides of the cover, and the groove circumferentially extends along the rim to accommodate the layered seam and the functional element.

In another form, the functional element has a varying thickness, and a thinner portion of the functional element is disposed along the groove.

In another form, the functional element is a heating element operable to generate heat. Alternatively, the functional element is a touch sensor, such as, for example, a capacitive touch sensor. Furthermore, the steering wheel may include more than one functional element to include both a heating element and a touch sensor.

In yet another form, the thickness of the first end portion and the second end portion of the cover are thinner than that of the remaining portions of the cover.

In still another form, the functional elements has a concave area at the groove of the padding member, and the layered seam is positioned at the concave area.

In another form, at the layered seam, the first end portion is folded inward on to itself to extend along and abut against an inner surface of the cover, and the second end portion extends parallel with the first end portion.

In another form, the the outer surface of the cover is substantially planar at the layered seam.

In one form, the present disclosure further provides a steering wheel comprising a padding member forming a body and defining a groove extending along the body, a functional layer over the body of the padding member, and a material layer overlaying the padding member and the functional layer. The material layer includes a layered seam at the groove. At the layered seam, a first end portion and a second end portion of the material layer extend in parallel under and along an outer surface of the material layer, and the second end portion is positioned between the first end portion and the functional layer.

In various forms, the second end portion wraps about the first end such that the first end is located between the second end and the outer surface of the material layer. The outer surface of the material layer may be substantially planar at the layered seam. The functional layer may include a heating element or capacitive touch sensors.

In one form, the present disclosure provides a steering wheel that includes a core assembly defining a rim, at least one functional element around the rim, and a cover wrapped around the functional element. The cover includes a layered seam and at the layered seam, a first end portion and a second end portion of the cover extend in parallel under and along an outer surface of the cover, and the second end portion is positioned between the first end portion and the functional layer In another form, the steering wheel further comprises a padding member disposed between the rim and functional element. The padding member defines a groove.

In another form, the functional element overlaps and has a concave area at the groove, and the layered seam is positioned at the concave area and the groove.

In another form, the functional element is a heating element operable to generate heat. Alternatively, the functional element is a touch sensor. However, the steering wheel may include both a heating element and a touch sensor when more than one functional element is employed.

In yet another form, the material layer is made of a textile material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
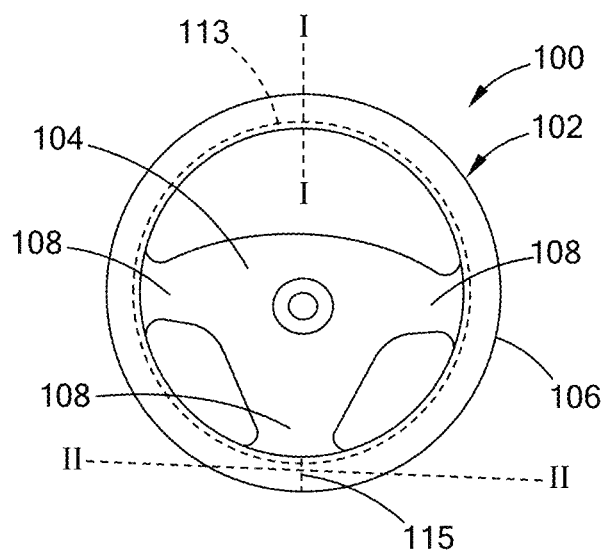
FIG. 1 is a front view of a steering wheel according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a front view of an exemplary steering wheel for a motorized vehicle according to the present disclosure is illustrated and generally indicated by the reference numeral 100. The steering wheel 100 includes an armature or core assembly 102 that defines a central hub 104, an outer rim 106 and multiple spokes 108 extending from the central hub 104 to the outer rim 106. The number of spokes 108 and position of each spoke 108 may vary depending on the design, and therefore, any number of spokes (i.e., one or more) may be employed while still remaining within the scope of the present disclosure. The core assembly 102 defines the body of the steering wheel and is the support structure for the remaining components of the steering wheel. In one form, the core assembly 102 is made of a rigid material, such as a metal and/or composite material like a fiber-reinforced polymer.

Figure 2:
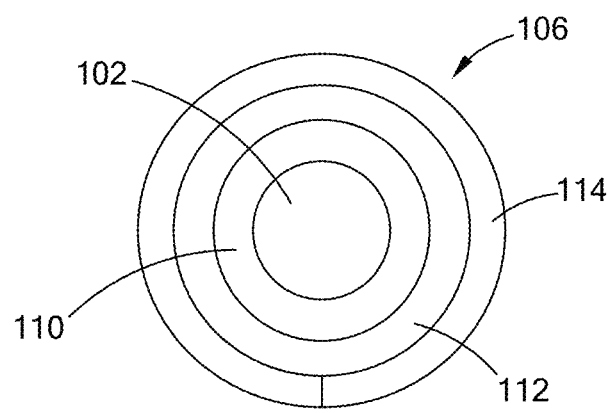
FIG. 2 is a cross-sectional view of the steering wheel of FIG. 1 along line I-I.

Referring to FIG. 2, a cross-sectional view taken from section line I-I of the outer rim 106 of the steering wheel 100 of FIG. 1 is shown. It should be understood that although the outer rim 106 is illustrated as having a circular cross-section, other geometric cross-sectional shapes may be employed while still remaining within the scope of the present disclosure. In one form, the steering wheel 100 includes a padding member 110, a functional element 112, and a cover 114. The padding member 110 is disposed along the outer rim 106 of the steering wheel 100 to provide support and comfort to a driver. In one form, the padding member 110 is made of extruded polystyrene foam that is deposited or molded on to the outer rim 106 of the core assembly 102. The padding member may be made of other suitable material.

The functional element 112 is superimposed on the padding member 110, and is operable to support an auxiliary feature of the steering wheel 100. For example, the functional element 112 may be a heating element that is operable to heat the steering wheel 100, and/or a capacitive touch sensor that is operable to detect physical contact of the steering wheel 100. Other functional elements may also be used, and are within the scope of the present disclosure. The steering wheel 100 may be configured to utilize more than one functional element to support two different auxiliary features. For example, in one form, the steering wheel 100 may include a heating element and a sensor element arranged about the padding member 100 in an overlapping manner. In another example, the steering wheel 100 is configured to have heating and sensing zones arranged about the steering wheel 100, such that the heating zones include the heating element as the functional element 112 and the sensing zone includes the sensor element as the functional element 112.

The cover 114 forms a protective barrier between the driver and the different layers of the steering wheel 100, and is disposed about the functional element 112. In one form, the cover 114 is a textile material, such as a natural or synthetic leather, and/or other suitable material. Based on the configuration of the steering wheel 100, the cover 114 may extend the entire surface of the steering wheel 100 using one or more pieces of material or alternatively, may be arranged at one or more sections of the steering wheel 100.

In one form, the cover 114 defines one or more seams for joining the sides of the material. For example, at least one seam circumferentially extends along the steering wheel 100 to join the longitudinal sides of the material, and at least one seam extends transverse to the longitudinal sides to join the short sides of the material. For example, referring to FIG. 1, a perimeter seam 113 is provided along an inner radius of the steering wheel 100 and a layered seam 115 is provided along a lower portion of the steering wheel 100. In one form, the longitudinal sides of the material are joined by way of a stitch or an adhesive to form the perimeter seam 113.

Figure 3:
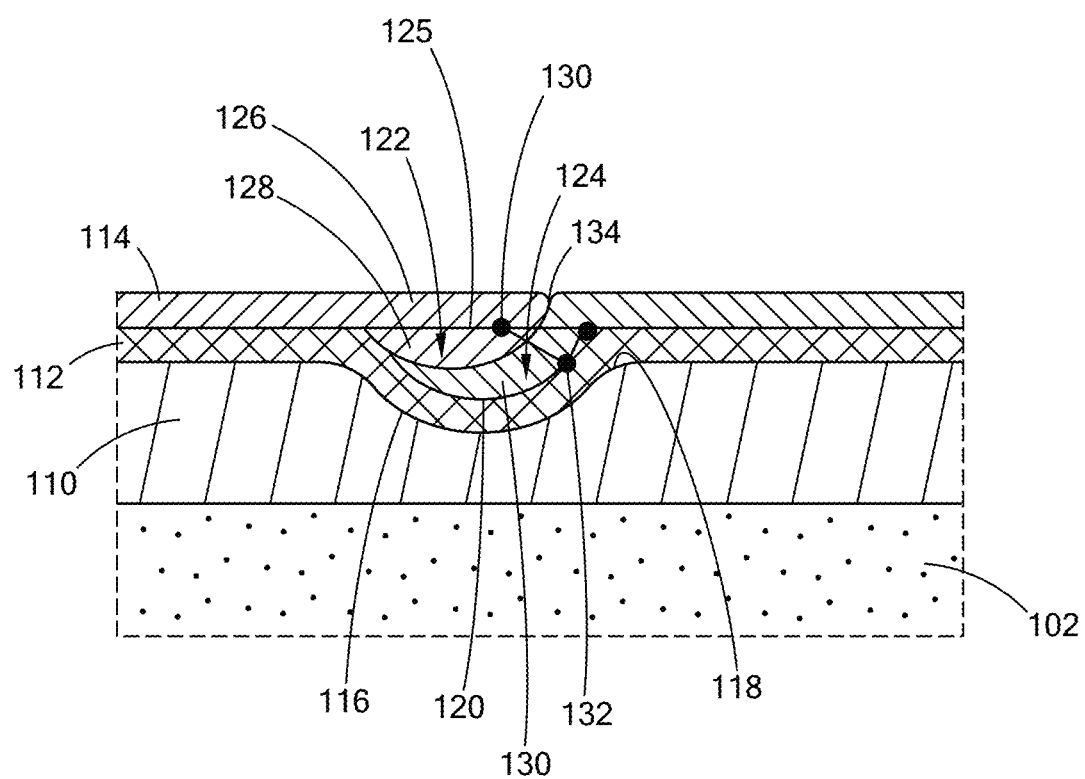
FIG. 3 is a cross-sectional view of the steering wheel of FIG. 1 along line II-II.

The layered seam 115 circumferentially extends about the rim 106 to join the short sides of the cover 114, and is configured to have a multilayer structure superimposed along a groove. More particularly, referring to FIG. 3, a partial cross-sectional view of the layered seam 115 taken from section line II-II of the steering wheel 100 of FIG. 1 is illustrated. In one form, the padding member 110 defines a groove 116 along an outer face 118 of the padding member 110. The groove 116 extends circumferential about the outer face 118, and is configured to receive the functional element 112 and the layered seam 115, such that the cover 114 is substantially planar at the seam 115. In one form, with the functional element 112 overlapping the groove 116, the functional element 112 has a concave area 120 that resides within the groove 116.

The cover 114 has a first end portion 122 and a second end portion 124 opposite the first end portion 122. At the layered seam 115, the first end portion 122 is folded and tucked under its own side to extend along and abut against an interior surface 125 of the cover 114. The second end portion 124 extends parallel with the first end portion 122 and is arranged below the first end portion 122. More particularly, the layered seam 115 forms a top layer 126, a mid-layer 128, and a bottom layer 130 with the first end portion 122 and the second end portion 124. The first end portion 122 and the second end portion 124 are held in place by a stitch 132.

With the cover 114 positioned on the steering wheel 100, the first end portion 122 and the second end portion 124 are superimposed on the functional element 112 at the groove 116 of the padding member 110. More particularly, the layered seam 115 is positioned within the concave area 120 of the functional element 112, which overlaps the groove 116, such that the second end portion 124 is positioned between the functional element 112 and the first end portion 122. The groove 116 is configured to retain the layered seam 115 and the functional element 112, such that an outer surface of the cover 114 is substantially planar at the layered seam 115.

By having the groove 116 about the padding member 110 and the layered seam 115, the steering wheel 100 has a continuous functional layer provided by the functional element 112 that is accommodated in the groove 116 of the padding member 110. In addition, the groove 116 is configured to accommodate not only the functional element 112, but also the layered seam 115, such that an outer surface of the cover 114 is substantially planar at the layered seam 115.

To further promote a smooth outer surface of the cover without compromising functionality, the thickness of the cover and/or the functional layer may be varied. For example, the thickness of the textile material used for the cover may be thinner at first end portion and the second end portion. Similarly, the functional element may have a varying thickness, such that the thinner portion of the functional element is disposed along the groove of the padding member.

It should be understood that the steering wheel may include more than one layered seam and groove configuration, and should not be limited to just one. In addition, the perimeter seam may also be provided as multiple seams disposed about the steering wheel to join the longitudinal sides of the cover.

Figure 4:
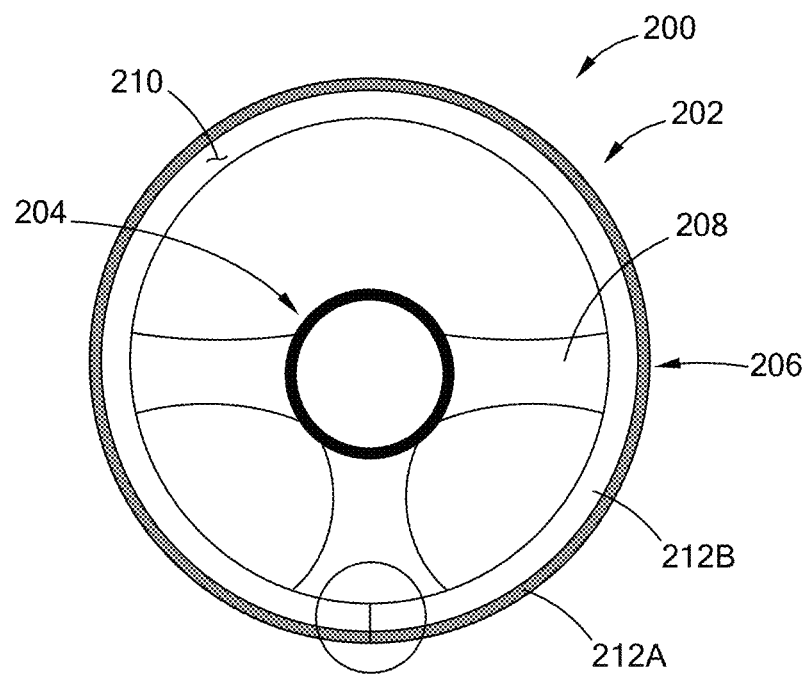
FIG. 4 is a front view of a steering wheel having dual material cover according to the present disclosure.
Figure 5:
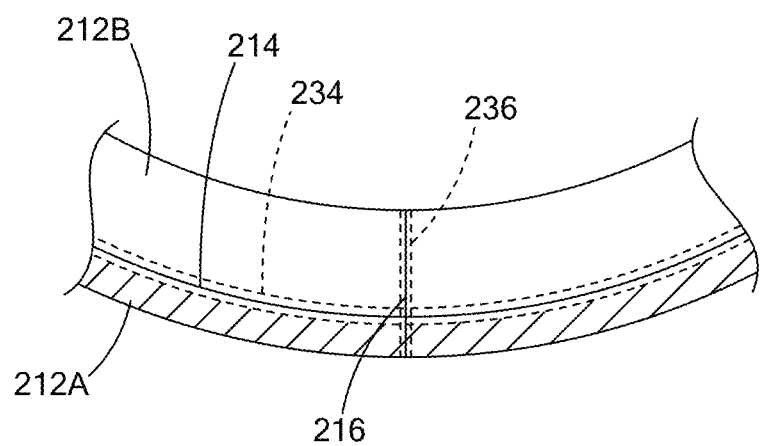
FIG. 5 is an enlarged view of area A of the steering wheel of FIG. 4.

Furthermore, the configuration of the groove and the layered seam of the present disclosure is not limited to joining the short ends of the cover. For example, referring to FIGS. 4, 5, 6 a steering wheel 200 includes a includes a core assembly 202 that defines a central hub 204, an outer rim 206, and multiple spokes 208 extending from the central hub 204 to connect to the outer rim 206. The steering wheel further 200 further includes a cover 210 that is wrapped about the rim 206. While not shown, the steering wheel 200 also includes a padding member and a functional element arranged under the cover 210.

In one form, the cover 210 is made of two textile materials that are joined along a longitudinal side of the materials. For example, the cover 210 includes a first material 212A and a second material 212B that are of different color and may collectively be referred to as materials 212. The two materials 212 may be of different colors, as illustrated, and/or may be of different materials. The first material 212A and the second material 212B are of equal length to circumferentially extend about the steering wheel 200. In one form, before being arranged on the rim 206, the first material 212A and the second material 212B are joined along one pair of the longitudinal sides to form a first layered seam 214 and along the short side to form a second layered seam 216.

Figure 6:
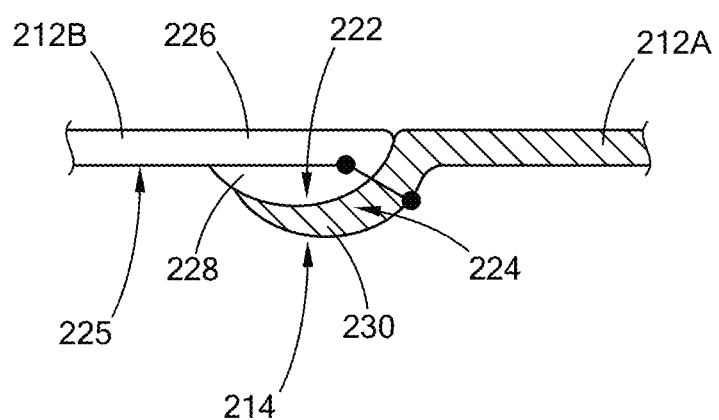
FIG. 6 is a cross-sectional view of a layered seam of the steering wheel of FIG. 4.

The first layered seam 214 and the second layered seam 216 are configured in a similar manner as the layered seam 115. More particularly, for the first layered seam 214, one of the materials 212 forms a first end portion 222 of the cover 210 and the other material forms a second end portion 224 of the cover 210 (FIG. 6). The first end portion 222 is folded and tucked under its own side to extend along and abut against an interior surface 225 of the cover 210. The second end portion 224 extends parallel with the first end portion 222 and is arranged below the first end portion 222. That is, the layered seam 214 forms a top layer 226, a mid-layer 228, and a bottom layer 230 with the first end portion 222 and the second end portion 224. The first end portion 222 and the second end portion 224 are held in place by a stitch 232.

While material 212A is illustrated as being the second end portion 224 and the material 212B as the first end portion 222, the materials 212 may be switched such that the material 212A is the first end portion 222 and the material 212B is the second end portion 224.

The second layered seam 216 is configured in a similar manner as the layered seams 115 and 214. In one form, with the cover 210 positioned on the steering wheel 200, the second longitudinal sides of the materials 212 are joined by way, for example, a stitch or adhesive to form a third seam (not shown).

Similar to the steering wheel 100, the padding member also includes grooves for supporting the layered seams 214 and 216. For example, the padding member defines a first groove 234 that circumferentially extends along the steering wheel 200 and a second groove 236 that circumferentially extends about the rim 206. The first and second grooves 234, 236 are illustrated as dashed lines in FIG. 5. The first groove 234 is configured to accommodate the functional element and the first layered seam 214, and the second groove 236 is configured to accommodate the functional element and the second layered seam 216, such that the outer surface of the cover 210 is substantially planar along the seams 214 and 216.

Specifically, like steering wheel 100, the functional element overlaps the grooves 234 and 236 and has a concave area at the grooves 234 and 236. For example, with regard to the first layered seam 214, the first end portion 222 and the second end portion 224 are superimposed on the functional element at the groove 234 Accordingly, the second end portion 224 is positioned between the functional element and the first end portion 222. The second layered seam 216, the second groove 236, and the functional element are arranged in a similar manner.

By having the grooves 234 and 236 about the padding member 110 and the layered seams 214 and 216, the steering wheel 200 has a continuous functional layer provided by the functional element that is accommodated in the groove 234 and 236 of the padding member. In addition, the groove 234 and 236 is configured to accommodate not only the functional element, but also the layered seams 214 and 216, such that an outer surface of the cover 210 is substantially planar at the layered seams 214 and 216.

The description of the disclosure is merely exemplary in nature and, thus, variations that do not depart from the substance of the disclosure are intended to be within the scope of the disclosure. For example, in addition to the seams (e.g., layered and/or perimeter), the steering wheel may include trim components, such as rings or inserts that are pressed and/or glued into the seam. Such variations are not to be regarded as a departure from the spirit and scope of the disclosure.

What is claimed is:

1. A steering wheel comprising:
   a core assembly including a rim;
   a padding member disposed on the rim and defining a groove;
   a functional element wrapped about the padding member; and
   a cover arranged about the rim over the functional element, the cover forming a layered seam at which a first end portion of the cover and a second end portion of the cover are joined in an overlapping manner, wherein the layered seam is superimposed at the groove, such that the second end portion is positioned between the functional element and the first end portion;
   wherein one or more of:

the thickness of the first end portion and the second end portion of the cover are thinner than that of the remaining portions of the cover; and the functional element has a concave area at the groove of the padding member, and the layered seam is positioned at the concave area.

2. The steering wheel of claim 1, wherein the layered seam joins two shorts sides of the cover, and the groove circumferentially extends about the rim to accommodate the layered seam and the functional element.

3. The steering wheel of claim 1, wherein the functional element has a varying thickness, and a thinner portion of the functional element is disposed along the groove.

4. The steering wheel of claim 1, wherein the functional element includes at least one of a heating element operable to generate heat or a touch sensor.

5. The steering wheel of claim 1, wherein, at the layered seam, the first end portion is folded inward on to itself to extend along and abut against an inner surface of the cover, and the second end portion extends parallel with the first end portion.

6. The steering wheel of claim 1, wherein the layered seam joins two longitudinal sides of the cover, and the groove circumferentially extends along the rim to accommodate the layered seam and the functional element.

7. The steering wheel of claim 1, wherein functional element includes at least one of a heating element or a sensor.

8. The steering wheel of claim 1, wherein the outer surface of the cover is substantially planar at the layered seam.

9. A steering wheel comprising:
a padding member forming a body and defining a groove extending along the body;
a functional layer provided over the body of the padding member; and
a material layer overlaying the padding member and the functional layer, the material layer having a layered seam at the groove, wherein at the layered seam, a first end portion and a second end portion of the material extend in parallel under and along an outer surface of the material layer, and the second end portion is positioned between the first end portion and the functional layer;
wherein the second end portion wraps about the first end portion such that the first end portion is located between the second end portion and the outer surface of the material layer.

10. The steering wheel of claim 9, wherein the outer surface of the material layer is substantially planar at the layered seam.

11. The steering wheel of claim 9, wherein the functional layer includes at least one of heating element or capacitive touch sensors.

12. A steering wheel comprising:
a core assembly defining a rim;
at least one functional element provided around the rim;
a cover wrapped around the functional element, and having a layered seam, wherein at the layered seam, a first end portion and a second end portion of the cover extend in parallel under and along an outer surface of the cover, and the second end portion is positioned between the first end portion and the functional layer; and
a padding member disposed between the rim and functional element, wherein the padding member defines a groove;
wherein at least one of the first end portion, the second end portion, or the functional element is configured to have a varying thickness at the groove.

13. The steering wheel of claim 12, wherein the functional element overlaps and has a concave area at the groove, and the layered seam is positioned at the concave area and the groove.

14. The steering wheel of claim 12, wherein the cover is made of a textile material.

15. The steering wheel of claim 12, wherein the at least one functional element includes at least one of a heating element operable to generate heat and a touch sensor.

* * * * *